US010178504B2

(12) United States Patent
Anderson et al.

(10) Patent No.: US 10,178,504 B2
(45) Date of Patent: *Jan. 8, 2019

(54) MONITORING A STATUS OF A DISCONNECTED DEVICE BY A MOBILE DEVICE AND AN AUDIO ANALYSIS SYSTEM IN AN INFRASTRUCTURE

(71) Applicant: International Business Machines Corporation, Armonk, NY (US)

(72) Inventors: Evelyn R. Anderson, Houston, TX (US); Natalie N. Brooks Powell, Bolingbrook, IL (US); Kristen N. Conley, Kieler, WI (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,973

(22) Filed: Dec. 13, 2017

(65) Prior Publication Data
US 2018/0302747 A1    Oct. 18, 2018

Related U.S. Application Data

(63) Continuation of application No. 15/489,789, filed on Apr. 18, 2017.

(51) Int. Cl.
*H04W 24/00*   (2009.01)
*H04W 4/02*    (2018.01)
(Continued)

(52) U.S. Cl.
CPC ............. *H04W 4/023* (2013.01); *H04W 4/12* (2013.01); *H04W 24/08* (2013.01);
(Continued)

(58) Field of Classification Search
CPC ..... H04W 64/00; H04W 8/245; H04W 84/18; H04W 4/02; H04W 88/02;
(Continued)

(56) References Cited

U.S. PATENT DOCUMENTS 8,350,694 B1    1/2013  Trundle et al.
9,089,123 B1 *  7/2015  Thomas ................ A01M 29/16
(Continued)

OTHER PUBLICATIONS

Appendix P List of IBM Applications or Patents Treated as Related. Dated Dec. 21, 2017. Two pages.
(Continued)

*Primary Examiner* — Danh C Le
(74) *Attorney, Agent, or Firm* — Edward P. Li

(57) ABSTRACT

A computer program product and a computer system for monitoring an operation status of a disconnected device by a mobile device and an audio analysis system in an infrastructure. The mobile device has connectivity to the infrastructure while the disconnected device has no connectivity to the infrastructure. The audio analysis system receives from the mobile device audio with information of a location of the mobile device. The audio analysis system determines whether the audio is recorded from the disconnected device based on the information of the location of the mobile device, compares the audio with pre-recorded sounds of the disconnected device, determines the operation status of the disconnected device, and sends to the mobile device a notification of the operation status of the disconnected device.

14 Claims, 5 Drawing Sheets

(51) Int. Cl.
*H04W 24/08* (2009.01)
*H04W 4/12* (2009.01)
*H04M 1/725* (2006.01)
*H04W 8/24* (2009.01)

(52) U.S. Cl.
CPC .... *H04M 1/72519* (2013.01); *H04M 1/72522* (2013.01); *H04W 8/245* (2013.01)

(58) Field of Classification Search
CPC ........ H04L 29/08657; H04M 1/72519; H04M 1/72522; G06K 19/0723; G06K 7/0008; H04B 5/02; H04R 29/00; H04R 29/001
USPC ............. 455/456.1, 418, 550.1, 41.2; 381/58
See application file for complete search history.

(56) References Cited

U.S. PATENT DOCUMENTS

| | | | |
|---|---|---|---|
| 9,635,165 B2* | 4/2017 | Liu | H04M 1/6058 |
| 9,930,159 B2 | 3/2018 | Mumick | |
| 9,949,064 B2* | 4/2018 | Ko | H04M 11/007 |
| 2006/0174297 A1 | 8/2006 | Anderson et al. | |
| 2008/0119160 A1 | 5/2008 | Laurent et al. | |
| 2008/0261564 A1 | 10/2008 | Logan | |
| 2009/0002191 A1 | 1/2009 | Kitaura | |
| 2009/0110161 A1* | 4/2009 | Darrow | H04M 9/003 379/93.05 |
| 2010/0302025 A1 | 12/2010 | Script | |
| 2013/0064386 A1* | 3/2013 | Yerrace | H04R 5/033 381/79 |
| 2013/0066453 A1 | 3/2013 | Seefeldt | |
| 2013/0094680 A1 | 4/2013 | Allen et al. | |
| 2013/0114653 A1* | 5/2013 | Schweikhardt | G11B 27/10 375/219 |
| 2013/0229263 A1 | 9/2013 | Graczyk et al. | |
| 2014/0018000 A1 | 1/2014 | Seymour et al. | |
| 2014/0024324 A1 | 1/2014 | Mumick | |
| 2014/0031082 A1 | 1/2014 | Zishaan | |
| 2014/0348070 A1 | 11/2014 | Swaay | |
| 2014/0368601 A1* | 12/2014 | deCharms | H04W 4/021 348/14.02 |
| 2015/0029880 A1 | 1/2015 | Burns et al. | |
| 2015/0127628 A1 | 5/2015 | Rathod | |
| 2016/0036958 A1 | 2/2016 | Logan et al. | |
| 2016/0063387 A1 | 3/2016 | Srivastava | |
| 2016/0100379 A1 | 4/2016 | Nguyen et al. | |
| 2016/0117905 A1 | 4/2016 | Powley | |
| 2016/0127878 A1 | 5/2016 | Clarke | |
| 2016/0128043 A1 | 5/2016 | Shuman et al. | |
| 2016/0261732 A1* | 9/2016 | Liu | H04M 1/6058 |
| 2016/0344745 A1 | 11/2016 | Johnson et al. | |
| 2016/0359325 A1 | 12/2016 | Kawata et al. | |
| 2017/0019525 A1 | 1/2017 | Hannon et al. | |
| 2017/0107090 A1 | 4/2017 | Mondal et al. | |
| 2017/0117003 A1 | 4/2017 | Takasu et al. | |
| 2017/0173262 A1* | 6/2017 | Veltz | A61M 5/1723 |
| 2018/0027346 A1* | 1/2018 | Hammell | H04R 29/00 |
| 2018/0120821 A1 | 5/2018 | Ayyagari et al. | |

OTHER PUBLICATIONS

Anderson et al. Original U.S. Appl. No. 15/840,189, filed Dec. 13, 2017.
Appendix P List of IBM Applications or Patents Treated as Related. Dated Dec. 8, 2016. Two pages.
Original U.S. Appl. No. 15/489,789, filed Apr. 18, 2017.
Mell et al. "The NIST Definition of Cloud Computing-Recommendations of the National Institute of Standards and Technology" Special Publication 800-145. Sep. 2011. Gaithersburg, MD.
Appendix P List of IBM Applications or Patents Treated as Related. Dated Apr. 25, 2018. Two pages.
Anderson et al. Original U.S. Appl. No. 15/962,157, filed Apr. 25, 2018.

\* cited by examiner

US 10,178,504 B2

MONITORING A STATUS OF A DISCONNECTED DEVICE BY A MOBILE DEVICE AND AN AUDIO ANALYSIS SYSTEM IN AN INFRASTRUCTURE

BACKGROUND

The present invention relates generally to a mobile device and an infrastructure or cloud computing environment, and more particularly to monitoring a status of a disconnected device by a mobile device and an audio analysis system in an infrastructure or cloud computing environment.

In the Internet of Things (IoT), physical devices, referred to as connected devices or smart devices, are connected in the inter-networking. The connected devices or smart devices are embedded with electronics, software, sensors, actuators, and network connectivity, so that these connected devices or smart devices are enabled to collect and exchange data. The status of these connected devices or smart devices can be reported to mobile devices such as smartphones. For example, a smart thermometer can track the temperature of food on a grill and send an alert to a mobile device such as a smartphone when the food reaches a certain temperature or cooking is finished. There are typically two means of connectivity for smart devices. First, smart devices with built-in cellular connectivity are connected to the cloud directly. Second, smart devices are paired to a cloud connected device; for example, the connectivity is established by creating a Bluetooth® connection between a smart device and a mobile device such as a smartphone. (Bluetooth is a trademark of Bluetooth Special Interest Group.)

However, many devices have no means of connectivity to the cloud and they are disconnected devices or non-smart devices. The disconnected devices or non-smart devices include appliances such as washing machines and dishwashers. The disconnected devices or non-smart devices also include smoke alarms. Many kitchen gadgets such as toasters are the disconnected devices or non-smart devices.

SUMMARY

In one aspect, a computer program product for monitoring an operation status of a disconnected device by a mobile device and an audio analysis system in an infrastructure is provided. The mobile device has connectivity to the infrastructure and the disconnected device has no connectivity to the infrastructure. The computer program product comprises a computer readable storage medium having program code embodied therewith. The program code is executable to receive from the mobile device, by the audio analysis system, audio with information of a location of the mobile device, wherein the audio is recorded during passive listening of the mobile device to the disconnected device. The program code is further executable to determine, by the audio analysis system, whether the audio is recorded from the disconnected device, based on the information of the location of the mobile device. The program code is further executable to compare, by the audio analysis system, the audio with pre-recorded sounds of the disconnected device, in response to determining that the audio is recorded from the disconnected device. The program code is further executable to determine, by the audio analysis system, the operation status of the disconnected device, based on a comparison of the audio and the pre-recorded sounds. The program code is further executable to send to the mobile device, by the audio analysis system, a notification of the operation status of the disconnected device, in response to determining that the operation status is an event predetermined by a user of the mobile device.

In another aspect, a computer system for monitoring an operation status of a disconnected device by a mobile device and an audio analysis system in an infrastructure is provided. The mobile device has connectivity to the infrastructure and the disconnected device has no connectivity to the infrastructure. The computer system comprises one or more processors, one or more computer readable tangible storage devices, and program instructions stored on at least one of the one or more computer readable tangible storage devices for execution by at least one of the one or more processors. The program instructions are executable to receive from the mobile device, by the audio analysis system, audio with information of a location of the mobile device, wherein the audio is recorded during passive listening of the mobile device to the disconnected device. The program instructions are further executable to determine, by the audio analysis system, whether the audio is recorded from the disconnected device, based on the information of the location of the mobile device. The program instructions are further executable to compare, by the audio analysis system, the audio with pre-recorded sounds of the disconnected device, in response to determining that the audio is recorded from the disconnected device. The program instructions are further executable to determine, by the audio analysis system, the operation status of the disconnected device, based on a comparison of the audio and the pre-recorded sounds. The program instructions are further executable to send to the mobile device, by the audio analysis system, a notification of the operation status of the disconnected device, in response to determining that the operation status is an event predetermined by a user of the mobile device.

DETAILED DESCRIPTION

Embodiments of the present invention disclose a system and method for monitoring a status of a disconnected device or non-smart device by a mobile device and an audio analysis system in a cloud infrastructure or cloud computing environment. The disconnected device or non-smart device has no means of connectivity to the cloud infrastructure or cloud computing environment, while the mobile device has connectivity to the cloud infrastructure. In the system and method, a mobile device (such as a smartphone) uses passive listening and a location service on a mobile device to determine whether a disconnected device (such as a washing machine) is emitting sounds. The cloud-based audio analysis system analyzes the sounds emitted by the disconnected device and determines the status of the disconnected device. Based on a predetermined event, the cloud-based audio analysis system issues a notification to the mobile device.

Figure 1:
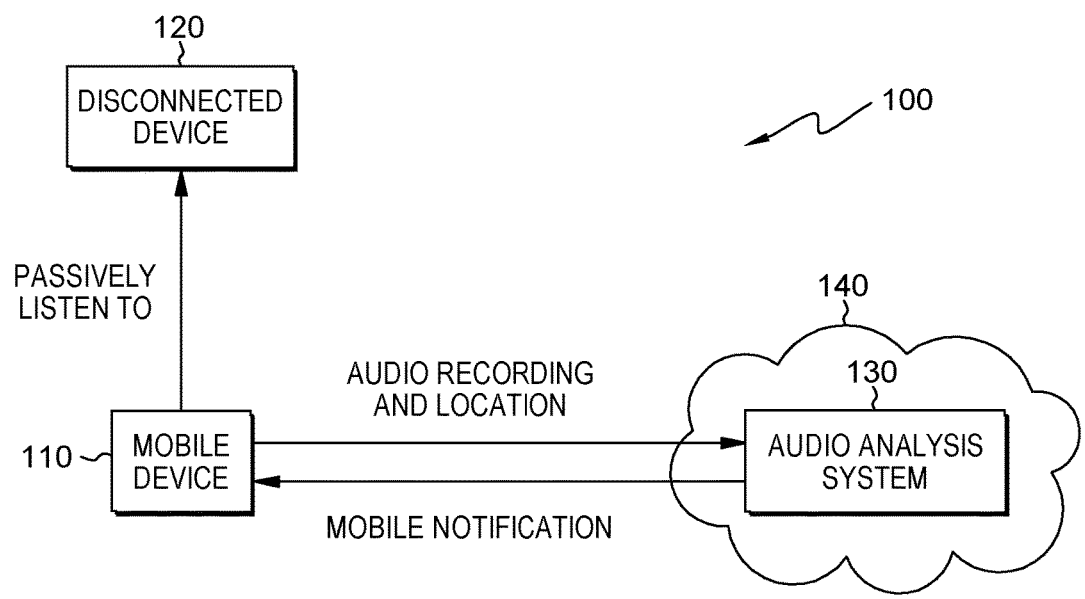
FIG. 1 is a diagram illustrating a system for monitoring a status of a disconnected device by a mobile device and an audio analysis system in a cloud infrastructure, in accordance with one embodiment of the present invention.

FIG. 1 is a diagram illustrating system 100 for monitoring a status of disconnected device 120 by mobile device 110 and audio analysis system 130 in cloud infrastructure 140, in accordance with one embodiment of the present invention.

Disconnected device (or non-smart device) 120 has no connectivity to cloud infrastructure 140. Disconnected device (or non-smart device) 120 may be an appliance such as a washing machine or a dishwasher. Disconnected device (or non-smart device) 120 may be, for example, a smoke alarm. Disconnected device (or non-smart device) 120 may be a kitchen gadget such as a toaster.

Mobile device 110 has connectivity to cloud infrastructure 140. For example, mobile device 110 is a smartphone. The smartphone, as a mobile computing device, has an operating system that is capable of running computing programs. The mobile computing device is described in more detail in later paragraphs with reference to FIG. 3 which illustrates components of a computing device.

In embodiments of the present invention, audio analysis system 130 is in cloud infrastructure 140. In one embodiment, audio analysis system 130 resides on a physical machine as a server in cloud infrastructure 140. The physical machine hosting audio analysis system 130 is a computing device which is described in more detail in later paragraphs with reference to FIG. 3. In another embodiment, audio analysis system 130 resides on a virtual machine or another virtualization implementation as a server in cloud infrastructure 140. The virtual machine or the virtualization implementation runs on a physical machine.

A mobile app running on mobile device 110 is defined to passively listen to the operation of disconnected device 120. A user of mobile device 110 specifies a list of disconnected devices (including disconnected device 120) and locations of the disconnected devices. For example, the user may specify that mobile device 110 passively listens to sounds from a laundry machine when the user is located near to a laundry room in a home. The mobile app on mobile device 110 uses a location service on mobile device 110, such as GPS and/or Beacons, to determine a current location of mobile device 110. When mobile device 110 is located at or near a predefined location of disconnected device 120 (such as the laundry machine in the laundry room), the mobile app invokes passive listening. The passive listening uses a microphone on mobile device 110 to automatically record audio. The passive listening is the same technology used by services such as "Hey Siri" on iOS, "Alexa" on Amazon, and "OK Google" on Android.

The mobile app on mobile device 110 analyzes passively recorded audio and determines whether the sound of disconnected device 120 can be detected. For example, when mobile device 110 is near the laundry room, mobile device 110 determines whether sound of the laundry machine be detected. When the sound of disconnected device 120 is audibly picked up by mobile device 110 or mobile device 110 determines that the sound of disconnected device 120 can be detected, mobile device 110 streams the audio with the information of the current location of mobile device 110 to audio analysis system 130 in cloud infrastructure 140, using network connectivity capabilities of mobile device 110.

In response to receiving the streamed audio with the information of the current location of mobile device 110, audio analysis system 130 determines from which specific one of disconnected devices the audio is recorded, based the information of the current location of mobile device 110. Audio analysis system 130 pairs the location of mobile device 110 and the predefined location of a specific of the disconnected devices. The information of predefined locations of different disconnected devices is stored in a knowledge base in cloud infrastructure 140. If audio analysis system 130 pairs the location of mobile device 110 with the predefined location of the specific one (e.g., disconnected device 120) of the disconnected devices, audio analysis system 130 can determine that the audio is recorded from the specific one (e.g., disconnected device 120) of the disconnected devices. For example, if audio analysis system 130 can pair the current location of mobile device 110 and the location of a washing machine in the laundry room, audio analysis system 130 can then determine that the audio recorded by mobile device 110 is from a washing machine instead of others such as a dishwasher.

Audio analysis system 130 analyzes the audio recorded and streamed by mobile device 110 and compares the recorded audio with various known sounds of disconnected device 120. The various known sounds (pre-recorded) of disconnected device 120 are stored in the knowledge database in cloud infrastructure 140. Based on a comparison of the audio and the various known sounds of disconnected device 120, by matching the audio with one of the various known sounds of disconnected device 120, audio analysis system 130 determines an operation status of disconnected device 120. For example, audio analysis system 130 compares the audio of a washing machine to washing machine's various sounds stored in the knowledge database. The washing machine's various known sounds are sounds for different operation cycles. By matching the streamed audio with one of the washing machine's various known sounds, audio analysis system 130 determines an operation cycle of the washing machine (such as a spin cycle, a soak cycle, etc).

Audio analysis system 130 updates the operation status in the knowledge database in cloud infrastructure 140. The user can check the operation status updated in the knowledge database in cloud infrastructure 140. For events predetermined by the user, audio analysis system 130 sends notifications to mobile device 110. For example, completion of operation cycles of the washing machine is an event predetermined by the user; when audio analysis system 130 determines that the washing machine's cycles complete, audio analysis system 130 sends a notification of the completion to mobile device 110.

Figure 2:
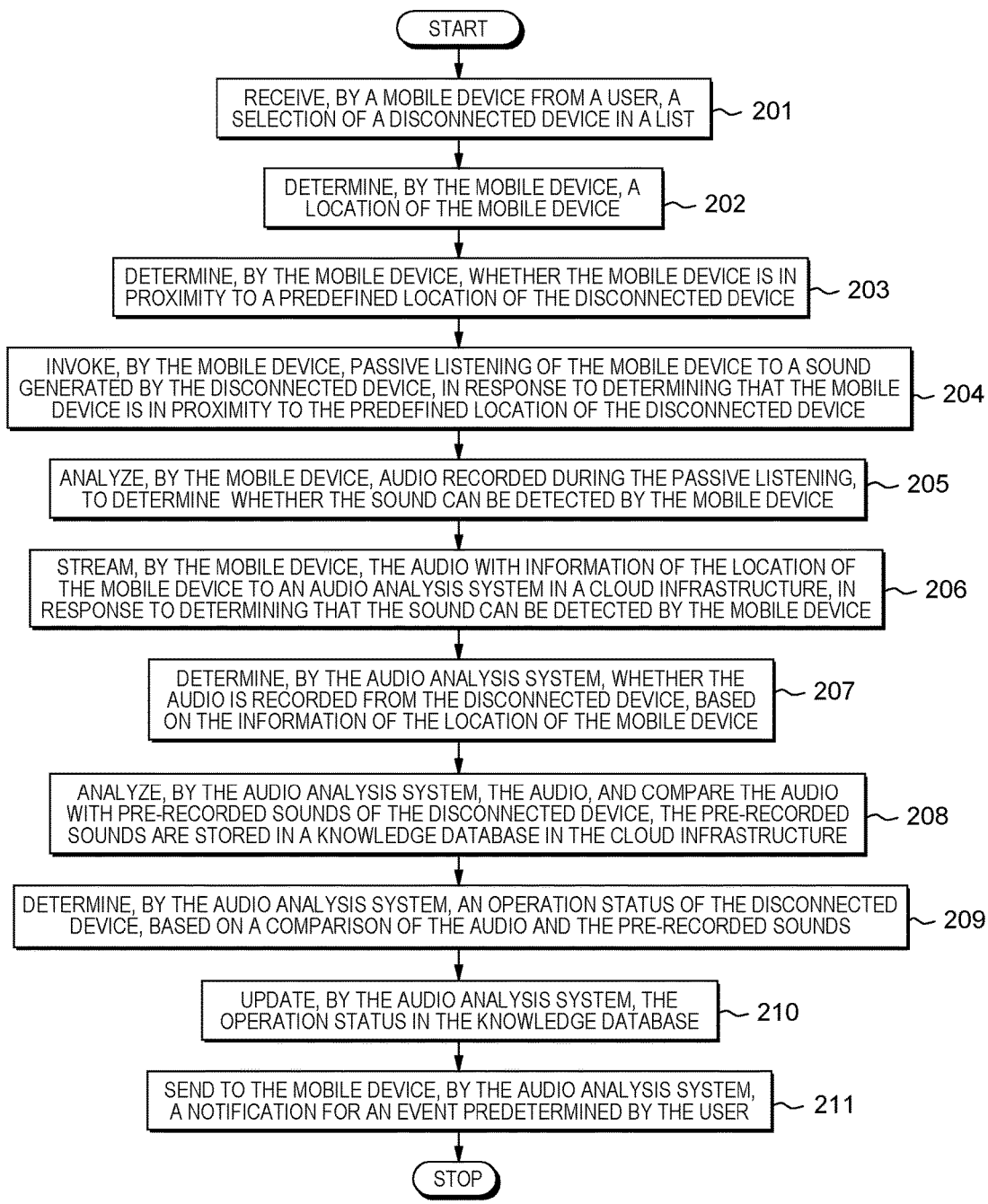
FIG. 2 is a flowchart showing operational steps for monitoring a status of a disconnected device by a mobile device and an audio analysis system in a cloud infrastructure, in accordance with one embodiment of the present invention.

FIG. 2 is a flowchart showing operational steps for monitoring a status of disconnected device 120 by mobile device 110 and audio analysis system 130 in cloud infrastructure 140, in accordance with one embodiment of the present invention. At step 201, mobile device 110 receives from a user a selection of disconnected device 120 in a list of disconnected devices. At step 202, mobile device 110 determines a location of mobile device 110. A mobile app on mobile device 110 uses a location service on mobile device 110 to determine the current location of mobile device 110. For example, the location service on mobile device 110 is GPS or Beacons.

At step 203, mobile device 110 determines whether mobile device 110 is in proximity to a predefined location of disconnected device 120. In response to determining that mobile device 110 is in proximity to the predefined location of disconnected device 120, at step 204, mobile device 110 invokes passive listening of mobile device 110 to a sound generated by disconnected device 120. A mobile app on mobile device 110 invokes passive listening. For example, the passive listening uses a microphone on mobile device 110 to automatically record audio.

At step 205, mobile device 110 analyzes audio recorded during the passive listening to determine whether the sound can be detected by mobile device 110. In response to determining that the sound can be detected by mobile device 110, at step 206, mobile device 110 streams the audio with information of the location of mobile device 110 to audio analysis system 130 in cloud infrastructure 140.

In response to receiving the streamed audio with the information of the location of mobile device 110, at step 207, audio analysis system 130 determines whether the audio is recorded from disconnected device 120, based on the information of the location of mobile device 110. To determine from which one of disconnected devices the audio is recorded, audio analysis system 130 pairs the location of mobile device 110 and the predefined location of the one of the disconnected devices. The information of the predefined locations of the disconnected devices is stored in a knowledge base in cloud infrastructure 140. Audio analysis system 130 determines the audio is recorded from disconnected device 120, if the location of mobile device 110 matches the predefined location of disconnected device 120.

In response to determining that the audio is recorded from disconnected device 120, at step 208, audio analysis system 130 analyzes the audio (which is streamed form mobile device 110) and compares the audio with pre-recorded sounds of disconnected device 120. The pre-recorded sounds of disconnected device 120 are generated in different operation statuses of disconnected device 120 and stored in the knowledge base in cloud infrastructure 140.

At step 209, audio analysis system 130 determines an operation status of disconnected device 120, based on a comparison of the audio and the pre-recorded sounds of disconnected device 120. Audio analysis system 130 makes the determination of the operation status by matching the audio with one of the pre-recorded sounds of disconnected device 120. At step 210, audio analysis system 130 updates the operation status of disconnected device 120 in the knowledge database.

At step 211, audio analysis system 130 sends to mobile device 110 a notification for an event predetermined by the user of mobile device 110. A predetermined event is a certain operation status for the user receiving the notification from audio analysis system 130. At this step, in response to determining that the operation status determined at step 209 is the event predetermined by the user of mobile device 110, audio analysis system 130 sends to mobile device 110 the notification of the operation status. For example, if completion of an operation of disconnected device 120 is an event predetermined by the user, audio analysis system 130 sends a notification of the completion to mobile device 110 when audio analysis system 130 determines that the operation of disconnected device 120 completes.

Figure 3:
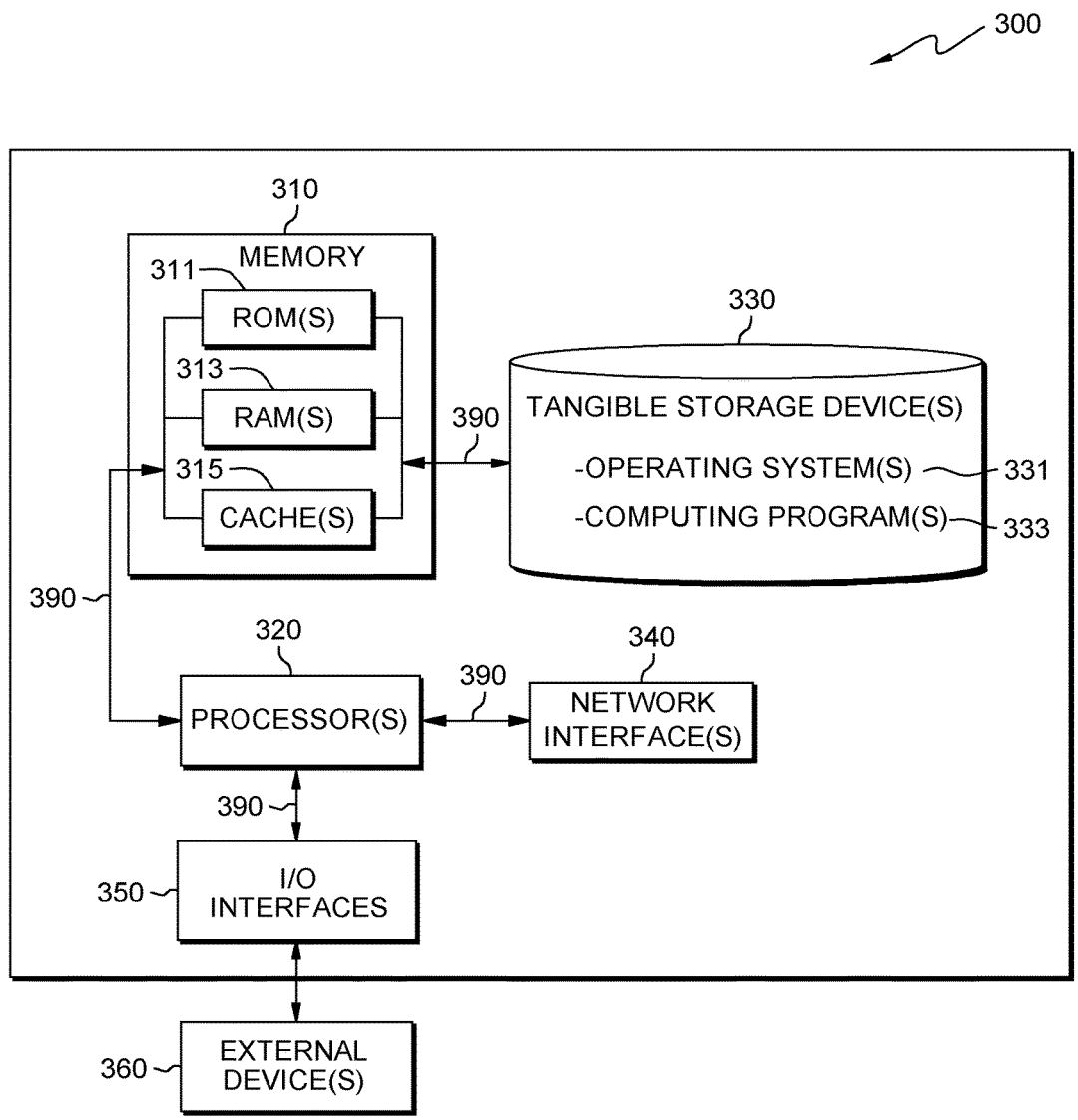
FIG. 3 is a diagram illustrating components of a computing device, in accordance with one embodiment of the present invention.

FIG. 3 is a diagram illustrating components of computing device 300, in accordance with one embodiment of the present invention. It should be appreciated that FIG. 3 provides only an illustration of one implementation and does not imply any limitations with regard to the environment in which different embodiments may be implemented.

Referring to FIG. 3, computing device 300 includes processor(s) 320, memory 310, and tangible storage device(s) 330. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. On mobile device 110, one or more computer programs 333 include one or more mobile applications for implementing operational steps 201-206 shown in FIG. 2. Audio analysis system 130 resides on one or more computer readable tangible storage device(s) 330 on a server in cloud infrastructure 140.

Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
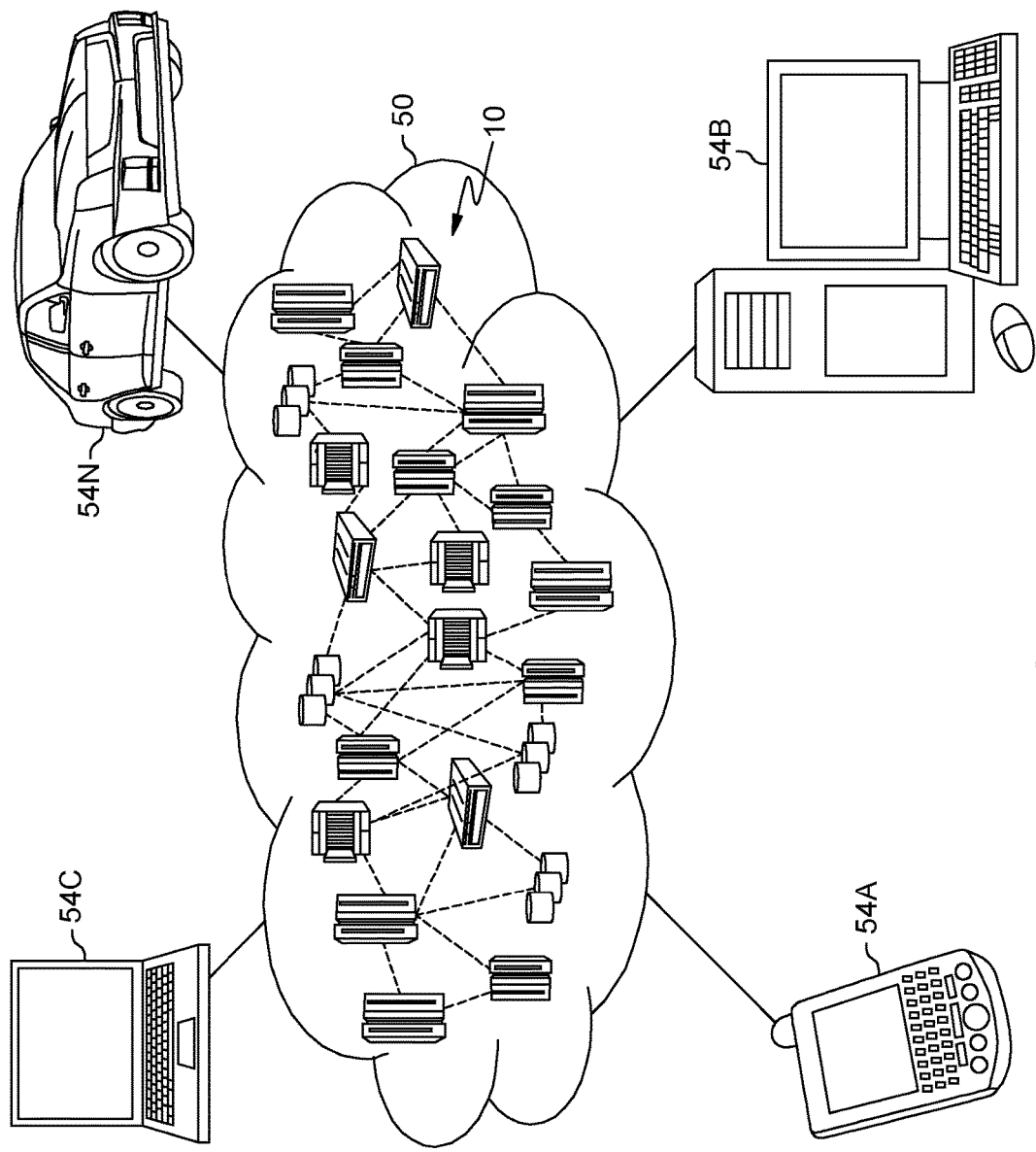
FIG. 4 depicts a cloud infrastructure environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A (for example mobile device 110 as shown in FIG. 1), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
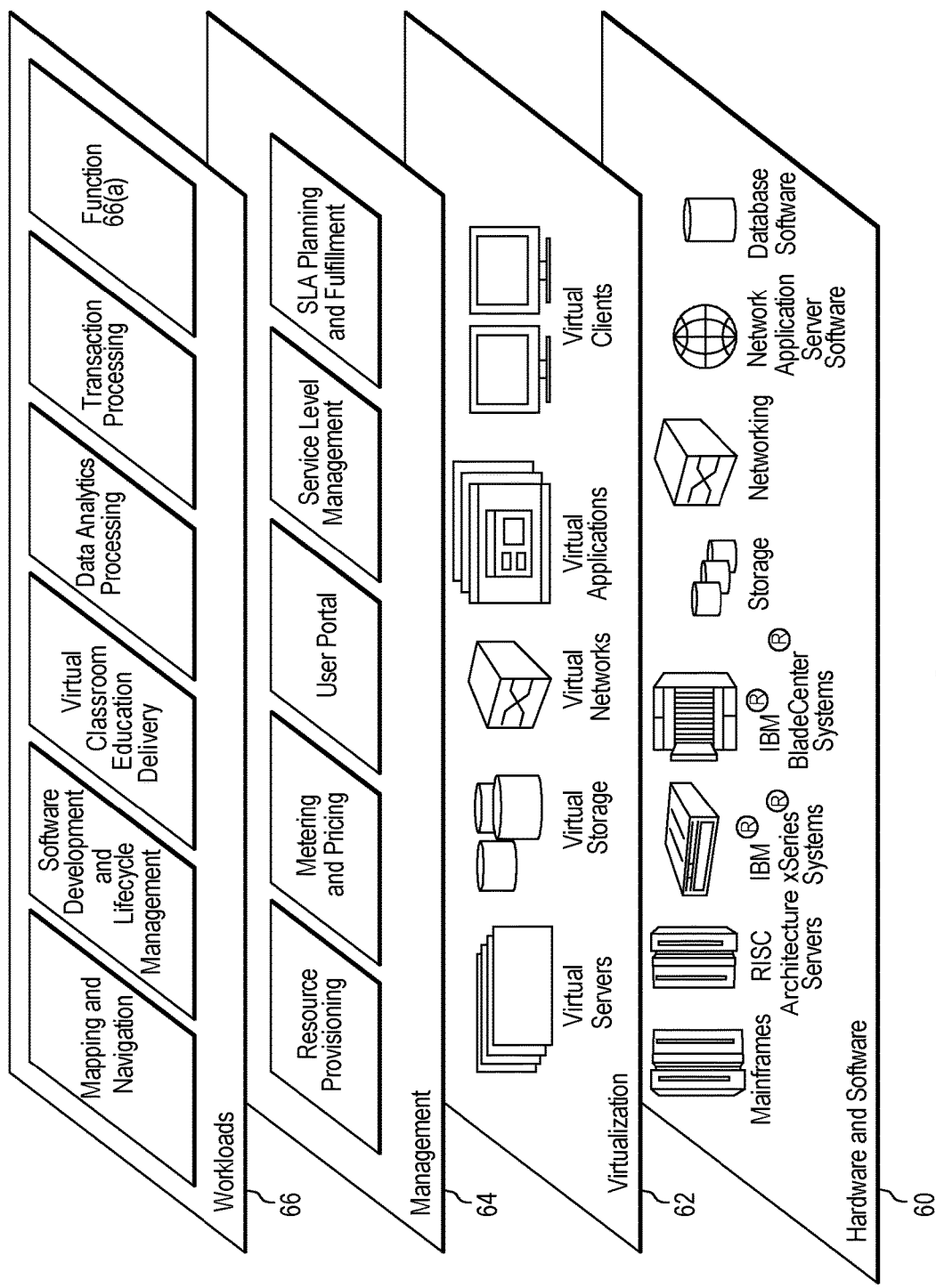
FIG. 5 depicts abstraction model layers in a cloud infrastructure environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality of audio analysis system 130 in cloud infrastructure 140 shown in FIG. 1. Audio analysis system 130 in cloud infrastructure 140 has been discussed in detail in previous paragraphs of this document.

What is claimed is:

1. A computer program product for monitoring an operation status of a disconnected device by a mobile device and an audio analysis system in an infrastructure, wherein the mobile device has connectivity to the infrastructure and the disconnected device has no connectivity to the infrastructure, the computer program product comprising a computer readable storage medium having program code embodied therewith, the program code executable to:

receive from the mobile device, by the audio analysis system, audio with information of a location of the mobile device, wherein the audio is recorded during passive listening of the mobile device to the disconnected device;

determine, by the audio analysis system, whether the audio is recorded from the disconnected device, based on the information of the location of the mobile device;

compare, by the audio analysis system, the audio with pre-recorded sounds of the disconnected device, in response to determining that the audio is recorded from the disconnected device;

determine, by the audio analysis system, the operation status of the disconnected device, based on a comparison of the audio and the pre-recorded sounds; and send to the mobile device, by the audio analysis system, a notification of the operation status of the disconnected device, in response to determining that the operation status is an event predetermined by a user of the mobile device.

2. The computer program product of claim 1, further comprising the program code executable to:

invoke, by the mobile device, the passive listening of the mobile device to a sound generated by the disconnected device, in response to determining that the mobile device is in proximity to a predefined location of the disconnected device;

determine, by the mobile device, whether the sound can be detected by the mobile device;

stream, by the mobile device, the audio with the information of the location of the mobile device to the audio analysis system, in response to determining that the sound can be detected by the mobile device; and receive, by the mobile device, the notification of the operation status.

3. The computer program product of claim 2, further comprising the program code executable to:

receive from the user, by the mobile device, a selection of the disconnected device in a list of disconnected devices;

determine, by the mobile device, the location of the mobile device; and determine, by the mobile device, whether the mobile device is in proximity to the predefined location of the disconnected device.

4. The computer program product of claim 3, wherein the mobile device uses a location service on the mobile device to determine the location of the mobile device.

5. The computer program product of claim 1, further comprising the program code executable to:

update, by the audio analysis system, the operation status of the disconnected device in a knowledge database in the infrastructure.

6. The computer program product of claim 1, wherein the pre-recorded sounds is stored in a knowledge database in the infrastructure.

7. The computer program product of claim 1, further comprising the program code executable to:

pair, by the audio analysis system, the location of the mobile device and a predefined location of the disconnected device, wherein information of the predefined location of the disconnected device is stored in a knowledge database in the infrastructure.

8. A computer system for monitoring an operation status of a disconnected device by a mobile device and an audio analysis system in an infrastructure, wherein the mobile device has connectivity to the infrastructure and the disconnected device has no connectivity to the infrastructure, the computer system comprising:

one or more processors, one or more computer readable tangible storage devices, and program instructions stored on at least one of the one or more computer readable tangible storage devices for execution by at least one of the one or more processors, the program instructions executable to:

receive from the mobile device, by the audio analysis system, audio with information of a location of the mobile device, wherein the audio is recorded during passive listening of the mobile device to the disconnected device;

determine, by the audio analysis system, whether the audio is recorded from the disconnected device, based on the information of the location of the mobile device;

compare, by the audio analysis system, the audio with pre-recorded sounds of the disconnected device, in response to determining that the audio is recorded from the disconnected device;

determine, by the audio analysis system, the operation status of the disconnected device, based on a comparison of the audio and the pre-recorded sounds; and send to the mobile device, by the audio analysis system, a notification of the operation status of the disconnected device, in response to determining that the operation status is an event predetermined by a user of the mobile device.

9. The computer system of claim 8, further comprising the program instructions executable to:

invoke, by the mobile device, the passive listening of the mobile device to a sound generated by the disconnected device, in response to determining that the mobile device is in proximity to a predefined location of the disconnected device;

determine, by the mobile device, whether the sound can be detected by the mobile device;

stream, by the mobile device, the audio with the information of the location of the mobile device to the audio analysis system, in response to determining that the sound can be detected by the mobile device; and receive, by the mobile device, the notification of the operation status.

10. The computer system of claim 9, further comprising the program instructions executable to:

receive from the user, by the mobile device, a selection of the disconnected device in a list of disconnected devices;

determine, by the mobile device, the location of the mobile device; and determine, by the mobile device, whether the mobile device is in proximity to the predefined location of the disconnected device.

11. The computer system of claim 10, wherein the mobile device uses a location service on the mobile device to determine the location of the mobile device.

12. The computer system of claim 8, further comprising the program instructions executable to:

update, by the audio analysis system, the operation status of the disconnected device in a knowledge database in the infrastructure.

13. The computer system of claim 8, wherein the pre-recorded sounds is stored in a knowledge database in the infrastructure.

14. The computer system of claim 8, further comprising the program instructions executable to:

pair, by the audio analysis system, the location of the mobile device and a predefined location of the disconnected device, wherein information of the predefined location of the disconnected device is stored in a knowledge database in the infrastructure.

* * * * *